United States Patent [19]

Balchunas

[11] 4,345,389
[45] Aug. 24, 1982

[54] THERMOSTAT AND IRON ASSEMBLY

[75] Inventor: Charles A. Balchunas, Bethany, Conn.

[73] Assignee: General Electric Company, New York, N.Y.

[21] Appl. No.: 187,533

[22] Filed: Sep. 15, 1980

[51] Int. Cl.³ .............................. D06F 75/06; H01H 37/26
[52] U.S. Cl. ................................. 38/77.7; 38/77.83; 38/82; 219/252; 337/361
[58] Field of Search ............... 337/361, 347, 350, 354, 337/355, 365; 219/252, 251; 38/77.83, 82, 77.7

[56] References Cited

U.S. PATENT DOCUMENTS

| | | | |
|---|---|---|---|
| 2,071,209 | 2/1937 | Kuhn et al. | 337/361 |
| 2,191,670 | 2/1940 | Kuhn et al. | 337/361 |
| 2,500,760 | 3/1950 | Lee | 337/361 X |
| 3,170,998 | 2/1965 | Stahl | 337/365 X |
| 3,747,241 | 7/1973 | Davidson | 38/77.83 |
| 3,913,053 | 10/1975 | Place | 337/361 X |
| 3,919,793 | 11/1975 | Toft et al. | 38/77.83 |
| 3,949,344 | 4/1976 | Hancock et al. | 337/361 X |
| 4,166,994 | 9/1979 | De Remer | 337/361 X |
| 4,259,655 | 3/1981 | Balchunas | 219/252 X |
| 4,285,145 | 8/1981 | Balchunas | 38/77.7 |

Primary Examiner—Louis Rimrodt
Attorney, Agent, or Firm—John F. Cullen; George R. Powers; Leonard J. Platt

[57] ABSTRACT

A stacked snap-acting thermostat assembly in which a modification is provided of a single structural bracket extending over all the blades and mounted on and above the supported end with an enlarged integral portion having a bore therethrough to form an elongated bearing guide and support a control shaft rotatably in the bore contacting the tension part of the first element to position the upper spring blade. An arcuate cam surface is provided with end stops and facing the upper blade and a cam follower on the control shaft is biased by the upper blade against the cam surface, the entire arrangement providing a snap-acting thermostat of compact size with an improved mounting arrangement whereby a single bracket stacked mounting performs multiple functions of a shaft bearing, cam surface and end stops and with its shaft acting as an adjustment on the first element tension portion to vary the snap-action of the thermostat and act as a fixed locator of all the structural parts in intimate contact with an iron soleplate.

8 Claims, 5 Drawing Figures

THERMOSTAT AND IRON ASSEMBLY

BACKGROUND OF THE INVENTION

1. Field of the Invention

The invention herein pertains to a fast-acting thermostat assembly of a specific snap-action type as combined with a single integral bracket stacked assembly forming a sole intermediate piece to line up a first group of stacked thermostat parts and a second group of the thermostat control rod and associated parts as used on an iron soleplate for intimate contact therewith such that the single bracket in combination with the snap-action structure performs multiple functions of a shaft bearing, cam surface and stops and, with its shaft as an adjustment on a tension portion of the thermostat blade assembly to vary the snap-action, and form a single fixed locator between the various groups of separate structural parts that comprise the entire stack snap-action thermostat and iron assembly. In addition, the thermostat assembly may be used alone as well as preferably in intimate contact on an iron soleplate.

2. Description of the Prior Art

Appliances, such as irons, provide a mounting for a temperature controlling thermostat where the mount comprises a boss on the soleplate creating a heat sink or collecting conductor to sense temperature for the thermostat which is mounted in close contact on the boss to react to desired manually set temperature changes. Generally, in an iron, the thermostat is mounted centrally or in the forward portion of the soleplate to detect the hottest part and react accordingly.

Recent developments have produced lightweight plastic irons at a low price and such irons have required rearrangement of the otherwise conventional thermostats because of the combining of many functions in the molded plastic that eliminates many parts in the previous metallic iron. A forward thermostat location is advantageous in irons which provide extra steam capacity whereby an extra slug of water is pumped into a steam boiler, usually a separate chamber, to generate an extra surge of steam which is fed into the distribution system to exit soleplate ports as extra capacity steam. Numerous types of surge irons exist and a typical one is U.S. Pat. No. 3,919,793 of common assignment with main steam exiting most of the soleplate portion and surge steam exiting through a separate distribution system with a small number of ports not connected with the main steam system. Also, snap-acting thermostats for irons are known and generally used in foreign irons to make or break the circuits very quickly and prevent Radio Frequency Interference and meet other requirements. Such a thermostat is shown in U.S. Pat. No. 3,170,998. Also, the general stacked thermostat is known and used in many appliances such as irons, cooking appliances, and others where temperature is automatically set usually by a bi-metal thermostat to maintain a selected temperature. It is desired that it be simple, inexpensive, and reliable, and use the fewest number of parts which are easily assembled. It must be accurate and have good calibration characteristics while being compact and have a positive "off" position with the electrical contacts well separated rapidly. It is known to use cams on thermostats to position an intermediate stiff blade carrying one of the electrical contacts with the cam allowing an infinite number of temperature settings for the iron. The cam is usually on the rotatable shaft with its follower on a movable blade and this arrangement requires extra parts and more complex construction. An improvement providing a more proficient arrangement in a thermostat assembly as used in an iron requiring fewer parts to reduce the assembly time, cost, and complexity is shown in copending application Ser. No. 051,831 filed June 25, 1979, now U.S. Pat. No. 4,259,655, granted Mar. 31, 1981 of common assignment. It is desired to provide this more efficient arrangement in combination with an improved snap-acting thermostat to improve the overall operation of the iron and thermostat.

SUMMARY OF THE INVENTION

The present invention is directed to a stacked snap-acting thermostat assembly per se and as used in combination in an electric steam iron with a water tank, steam-generating soleplate with ports, pump connected to the tank for manual operation and a boss or mount on the soleplate for close integral support of the heat-responsive stacked snap-acting thermostat to control the temperature of the soleplate. In this structure, an improved specific snap-acting thermostat is arranged in an improved stacked assembly that includes a vertical control rod in the forward handle portion of the iron with manual temperature adjustment means external to the iron shell high on the front of the handle. The stacked thermostat snap-acting assembly uses a lower heat deformable blade closely secured to the soleplate mounting boss and a conductive intermediate stiff blade with a conductive upper less stiff spring blade provided. All the blades are supported, secured, and spaced apart at one end by interposed insulators in a stacked sandwich type construction. In this assembly, the upper blade is made up of first and second strip type elongated elements including compression and tension portions so arranged and pivotally connected together that, with stops, the free or non-supported end reciprocates with a snap-action to quickly make and break the electrical circuit to the iron soleplate.

One of the stops is a fixed electrical contact on the stiff intermediate blade and the other a movable contact on the free end of the second element to rapidly make and break the circuit to control heat to the iron soleplate. Means is provided to transmit movement of the heat deformable blade to the upper blade to make and break the circuit in a snap-acting manner. To this snap-acting thermostat assembly, a single sole structural support bracket extends parallel over the blades and is mounted cantilever-like above the stack end with the bracket having an enlarged integral portion at its free end and an unobstructed smooth vertical bore through the enlarged portion to form an elongated bearing guide between the ends of and over the stacked blades. A control shaft, longitudinally slidable, is rotatably supported in the bore and extends into contact with the tension portion of the first element to position the upper spring blade. Operative structure or suitable adaptor connects the shaft and the iron control rod to rotate the shaft by the external adjustment means and set the iron temperature. An arcuate cam surface extending substantially 180°–230° is provided with end stops formed directly and as part of the lower surface of the integral portion to face the upper blade. A cam follower extends from the rotatable shaft and is biased by the upper blade against the cam surface, which surface has a sharp angular rise adjacent the lower temperature stop to provide, with the snap-acting structure, a quick separation of the contacts for a sharp "OFF" position. The single integral bracket performs multiple functions of shaft bearing, cam surface and stops, and with its shaft as an adjustment on the first element tension portion to vary the snap-action and the single bracket structure also acts as a fixed locator of all the structural parts between a group of stack assembly components and a group of the control rod and its connected means putting the improved thermostat tightly against the iron soleplate boss. Thus, the main object of the invention is to disclose a thermostat assembly and electric iron which uses a simplified snapacting thermostat construcion of fewer parts with a relatively heavy top integral structural bracket performing multiple functions in the thermostat and/or iron combination.

DESCRIPTION OF THE PREFERRED EMBODIMENT

The present invention will be described in connection with a lightweight plastic iron since it is especially applicable to such use although the thermostat assembly per se has other uses than on irons. Also, the invention represents an improved version of the thermostat assembly shown in said co-pending application Ser. No. 051,831, now U.S. Pat. No. 4,259,655 of common assignment.

Figure 1:
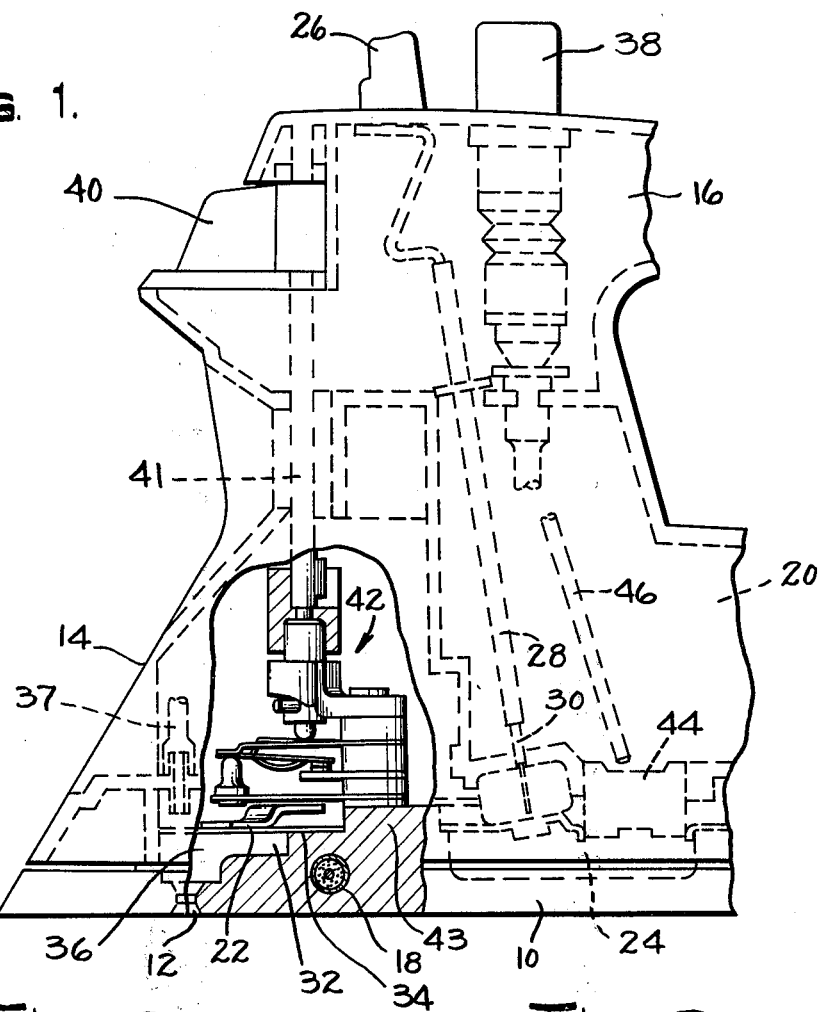
FIG. 1 is a partial elevation of a typical surge steam iron partly broken away to show the arrangement of the invention.

Referring to FIG. 1, there is shown an electric steam iron generally known which includes a soleplate 10 with a plurality of steam ports 12 and an outer shell 14 suitably connected with handle 16 in known fashion. Soleplate 10 may be cast aluminum with electric heating element 18 cast in position for uniform heat distribution when the iron is plugged in.

The iron includes means for generating steam with water tank 20, that may be part of a single plastic housing, secured by L-shaped fastener 22 and other suitable mechanism in conventional fashion. For steam, soleplate 10 has a steam generator 24 into which, under control of button 26 and guided valve stem 28 movable between an on/off position, water controllably drips from tank 20 onto hot soleplate 10 through metering water valve 30 of a known type, the resulting steam flowing through distributing passages 32 under coverplate 34 and out ports 12 onto the fabric being ironed. As shown, an additional surge is provided by injecting water into a separate forward surge generator 36 through line 37 via separate bellows pump manually operated by control button 38. A temperature adjustment means 40 external to shell 14 and high in the front of handle 16, connects with vertical control rod 41 in the forward portion of the handle to operate a thermostat generally indicated at 42 of the known stack type which is snugly mounted on soleplate boss 43 for intimate and substantially integral contact with the boss. The boss is preferably formed as shown as part of the iron soleplate casting for good heat sink contact. As thus far described, the structure is generally well-known.

If the iron is a self-cleaning iron of the type of U.S. Pat. No. 3,747,241 of common assignment, it has means for suddenly and completely dumping tank 20 onto the hot soleplate through a large opening that preferably, though not necessarily, is spaced and separate from the usual water valve 30. Controlling this large opening, dumper valve 44 is disposed in the bottom of tank 20 and operated through a rod 46 from a button, not shown, on the side of the iron to quickly empty the tank onto the soleplate where the combination of hot water and steam suddenly generated purges the internal passages, tank, and soleplate ports of lint and mineral deposits. In accordance with the present invention, an improved stacked, snap-acting thermostat assembly is provided for the iron for better heat response. The snap-acting structure is an improved version of that shown in U.S. Pat. No. 3,170,998 and integrated into the improved assembly shown in said co-pending application Ser. No. 051,831, now U.S. Pat. No. 4,259,655.

Figures 2, 3:
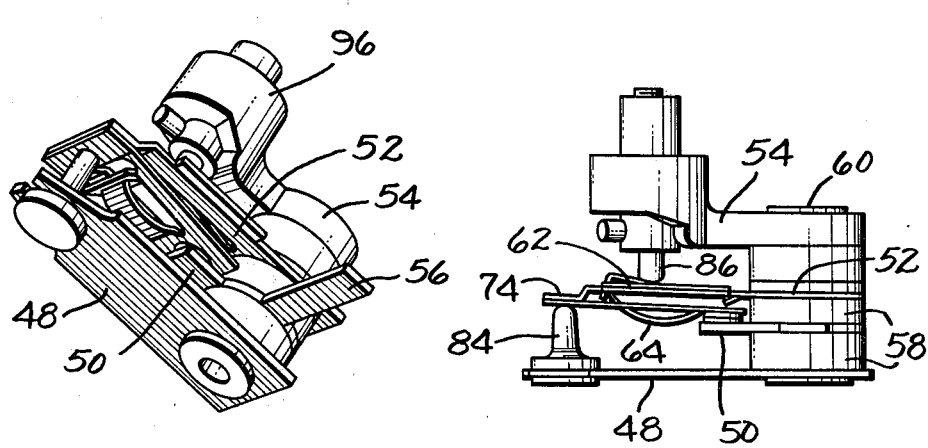
FIG. 2 is an enlarged perspective of the assembled thermostat.
FIG. 3 is an elevation view of the thermostat in closed position.
Figure 4:
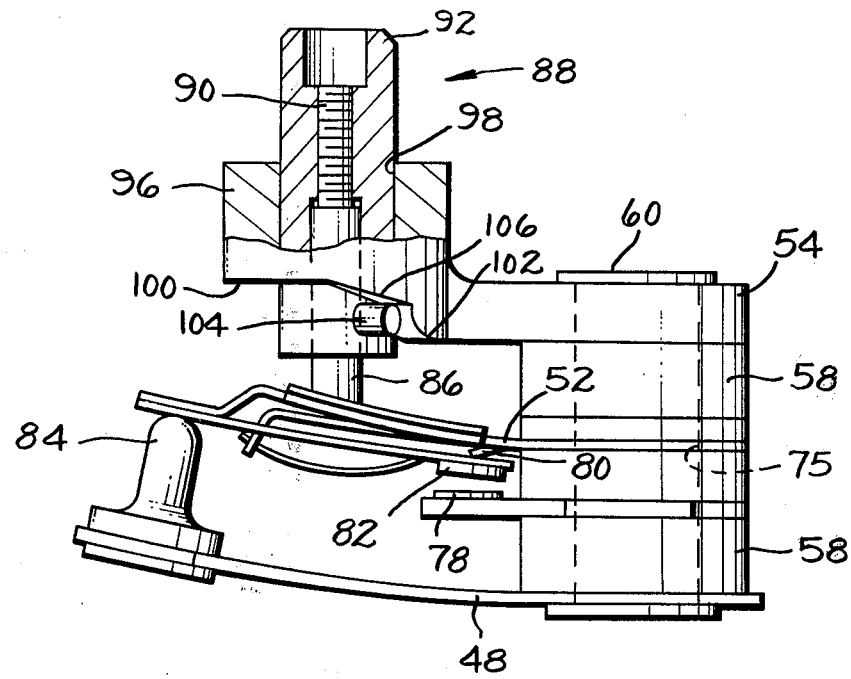
FIG. 4 is an enlarged elevation view of the thermostat with the structural bracket partly in section and with the contacts open.

In accordance with the invention, the thermostat is of the snap-acting stacked blade-type that comprises a multi-metal, usually a bi-, or tri-metal heat deformable or temperature-responsive blade 48 as best seen in FIGS. 2-4, a relatively stiff but flexible conductive intermediate blade 50 and a conductive and less stiff upper spring blade 52 with all three blades 48, 50, and 52 being supported and secured together at one end in a sandwich configuration along with an integral support bracket 54 parallel to and above flexible blade 52. The stacked configuration also includes separate conductive electrical terminals such as 56 connecting stiff blade 50 and flexible upper spring blade 52 not shown respectively. The blades, support bracket, etc., are spaced apart and electrically insulated at the one end by a conventional central insulating tube and interposed ceramic insulators 58 to electrically separate the parts with a suitable fastener 60 clamping the stacked assembly together at the one end for a mounting post to secure the assembly snugly and intimately to soleplate boss 43.

Figure 5:
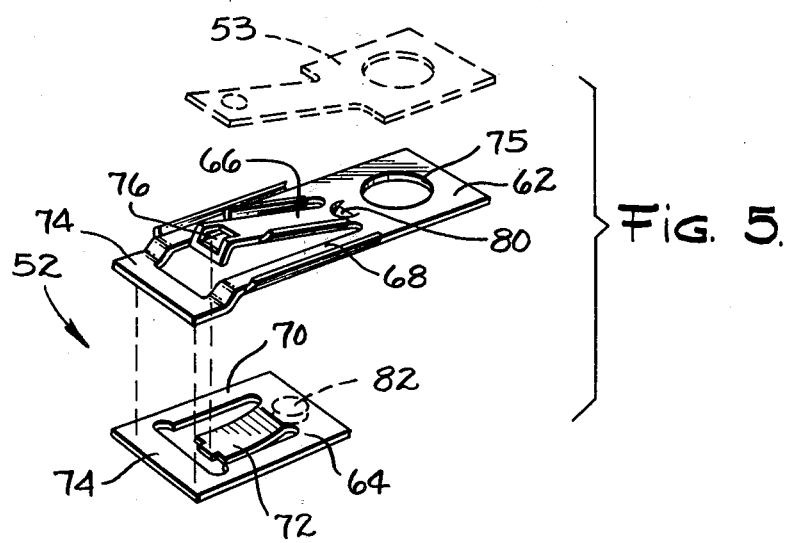
FIG. 5 is an exploded perspective of the snap-action elements in the thermostat.

In order to provide very rapid or snapaction, the upper blade 52 is comprised of two parts—first 62 and second 64—strip type elongated elements substantially parallel to each other as shown in FIG. 5. The first element 62 consists of an elongated spring strip with a central rectangular tension portion 66 and outer compression portion 68 while the second element 64 similarly rectangularly shaped has a tension portion 70 and a compression portion 72 with the two elements 62 and 64 spot welded together along one free end 74. An opening 75 supports one end of the first element 62 on the stack at the right end of FIG. 4 so that the other end 74 is free to flex vertically. A pivot means connects one end of the second element 64 to the free or non-supported end of first element 62 where the pivot includes a pivot joint of a tongue 72 and slot 76 of the compression portion 72 and tension portion 66 respectively of the two parts. Stops are provided on opposite sides of the non-pivot free end of second element 64, the stops being so related to the pivot means 72/76 so that the second element 64 free right end in FIG. 5 reciprocates between the stops with a snap-action on reciprocal movement from the pivot joint 72/76 between the elements 62 and 64. One of the stops is a fixed electrical contact 78 on the stiff intermediate blade 50 while the other is a movable pressed-out barb 80 disposed toward the free end, i.e., away from the stationary mounting portion 75, of the first element 62 to make and break the electric circuit to control the heat to the iron soleplate sensed by the thermostat. The operation of the general arrangement when it is bent and put in tension and compression respectively as shown in FIGS. 3 and 4 is similar to and fully described in said U.S. Pat. No. 3,170,998 using similar but different-shaped components. Suffice to say that the contacts 82 and 78 are closed as in FIG. 3 when the iron is cold and heat deformable bi-metal 48 is undeformed so that insulating button means 84, carried by bi-metal 48 at its free end, is free of or slightly touching the bottom second element 64 at its joint where they are spot welded together at 74 (FIG. 5). As the soleplate heats the bi-metal 48 distorts upwardly as shown in FIG. 4 with button 84 pushing against joint end 74 of the two elements to flex it upwardly while the pivot joint 72/76 remains relatively fixed because of contact with a vertically movable insulator 86 to be described more later which insulator holds the pivot point stationary. Movement continues until welded end 74 is slightly above the pivot joint 72/76 at which time the end of second element 64 carrying the contact 82 moves upwardly against barb stop 80 with a snap-action and separates the contacts to provide a fast snap-acting thermostat. On cooling, the reverse occurs with the bi-metal moving down to the FIG. 3 position until the end 74 moves below the pivot joint 72/76 when the contacts will close with a snap-action.

Integrated with this particularly described snap-action structure is the improved arrangement disclosed in said co-pending application Ser. No. 051,831, now U.S. Pat. No. 4,259,655, for an assembly where a single integral bracket forms a sole intermediate piece to line up a first group of stacked thermostat parts as just described and a second group of the thermostat control rod on the iron with its associated parts such that the bracket performs multiple functions as will become apparent. To this end, the thermostat comprises a control mechanism, shown in FIG. 4 generally indicated at 88 for adjusting the temperature for the thermostat to maintain the soleplate 10 at the desired temperature. The control mechanism rotatably vertically positions insulator 86 which, in turn, locates the horizontal positioning of upper blade 52 which, through its first and second strip type elongated elements 62 and 64 respectively, positions contact 82 for each desired temperature setting after the initial calibration obtained by adjusting screw 90. Adjusting screw 90 is set at the factory to properly locate the vertical positioning of insulator 86 and then the user sets temperature by rotation of adjustment means 40 and control rod 41 connecting with control shaft 92 by any suitable slidable connection.

The invention herein is directed to the integration between the snap-action thermostat structure previously described and the control mechanism in its unitary one-piece arrangement now described. To this end, support bracket 54, which may conveniently be of powdered metal, consists of a single structural bracket of integral one-piece construction extending over the blades and mounted cantilever-like from one end as shown. For holding the movable parts, the bracket has enlarged integrally formed portion 96 on the free end with a smooth unobstructed bore 98 completely through the enlarged portion forming an elongated bearing guide above the mid-portion or between the ends of and over the blades. Disposed in the bore is control shaft 92 that, with no threads, is freely slidable vertically at all times in the bore whose long supporting surface acts as an elongated bearing for the control shaft. The shaft, with its contained insulator 86 contacting tension portion 66 of the first element 62 of the upper spring blade 52 thus positions the tension portion 66 upon vertical movement of insulator 86. To provide the vertical movement, an arcuate cam surface 100 is formed directly on the lower surface of enlarged portion 96, the cam surface falling smoothly down for substantially 180°–230° and each end of the arc is provided with end stops such as lower temperature stop 102 which is the "OFF" position of the thermostat. A similar stop, not shown, is located on the opposite side or upper end of the cam which is the highest temperature "ON" position of the thermostat. For cooperating with the cam surface 100 facing the uppermost blade, a cam follower 104, in the form of a pin, extends outwardly from control shaft 92 and bears against the cam surface with the pin being held in position on the cam surface by the biasing effect of the upper blade 52. While not necessary for operation, this biasing effect can be supplemented if desired, by an additional spring blade 53 shown dotted in FIG. 5 with blade 53 sandwiched between and contacting both vertical insulator 86 and tension portion 66. It can be seen in FIG. 4 that cam surface 100 formed directly on and as part of the enlarged portion 96 is a substantially linear surface falling smoothly from the upper temperature stop on the opposite side of FIG. 4 down towards the blades over its arc of 180°–230° to the "OFF" position shown in FIG. 4. For a clean break of the two widely spaced contacts 78 and 82, the cam surface is provided with an angular sharp rise 106 of about 30° closely adjacent to lower temperature stop 102 to quickly separate the contacts to provide, with the snapaction structure previously described, a very fast and sharp "OFF" position against the lower stop 102.

One of the main differences between the present construction and the prior art is the placement of the cam directly on the lower surface of the enlarged portion 96 and the cam follower on rotating control shaft 92. By the use of the single integral support bracket 54 with its enlarged and contained cam portion, it is possible to achieve the same results as the reverse conventional arrangement while using fewer parts.

This part of the overall combination of the arrangement described of the single bracket and its included cam surface provides a long smooth bearing surface in bore 98 for the control shaft 92 while the enlarged portion also provides a base structure for the cam surface and stops to limit the control shaft travel. It lends itself well to the biasing effect of tension portion 66 to force relatively small follower 104 tightly against the cam surface for constant control of the vertical height. Finally, the integral substantially heavy support bracket 54 fixes the relationship of all the structural parts which are composed essentially of two groups of components. The first group is the complete stacked assembly of parts including the rivet fastener 60 and the snap-acting thermostat components and the second group includes the control rods 41 with all its associated parts. With this structure the contacts 78 and 82 are both disposed inward of the free ends of all the supported blades with the movable contact 82 on the free end of the second element 64 being disposed inwardly of the spot-welded pivot means 74 and/or the loose pivot 72/76 so that both contacts are disposed closely adjacent the stacked support to reduce the overall length of the thermostat. The bracket 54 thus integrates the line-up of components between each of the above described groups and ties them together to fix the relationship of all the structural parts thus performing multiple functions of a shaft-bearing, a cam surface and end stops, and with its shaft, an adjustment on the first element tension portion to vary the snapaction while acting as a locator of all the structural parts tightly against the iron soleplate boss 43 or other heat sink through which temperature is to be sent and the circuit controlled.

While I have hereinbefore described the preferred form of the invention, obvious equivalent variations are possible in light of the above teachings. It is therefore to be understood that within the scope of the appended claims, the invention may be practiced otherwise than as specifically described, and the claims are intended to cover such equivalent variations.

I claim:

1. A stacked snap-acting thermostat assembly of a lower heat deformable blade, a conductive intermediate stiff blade, a conductive upper less stiff spring blade with all blades supported, secured together and spaced apart at one end by interposed insulators, said upper blade comprising;

first and second strip type elongated elements substantially parallel to each other,
  each first and second element including compression and tension portions,
means supporting one end of the first element so the other end is free to flex vertically,
insulating means transferring deformable blade movement to said first element, pivot means connecting one end of the second element to the free end of the first,
said pivot including a pivot joint between the respective compression and tension portions to place said portions under compression and tension respectively, stops on opposite sides of the non-pivot free end of the second element and related to said pivot means so the second element free end reciprocates between said stops with a snap-action on reciprocal movement of the pivot joint between said elements,
  one of said stops being a fixed contact on the stiff intermediate blade and the other a movable stop on the free end of said first element to make and break an electric circuit to control heat to a medium sensed by said thermostat,
a single structural bracket extending over all said blades and mounted on and above said supported end with an enlarged integral portion on the free end,
  said portion having a bore therethrough forming an elongated bearing guide between the ends of and over said blades,
a control shaft rotatably supported in said bore and extending into contact with the tension portion of said first element to position said upper spring blade, an arcuate cam surface with end stops formed on said integral portion and facing said upper blade,
a cam follower on said control shaft and biased by said upper blade against said cam surface,
whereby the single bracket performs multiple functions of shaft bearing, cam surface and end stops, and with its shaft, an adjustment on the first element tension portion to vary the snap-action, and acts as a fixed locator of all structural parts.

2. Apparatus as described in claim 1 wherein said bore is smooth and unobstructed permitting free longitudinal sliding movement by the shaft at all times.

3. Apparatus as described in claim 2 wherein said cam surface falls smoothly from an upper temperature stop down toward said blades over an arc between substantially 180°–230° and
  an angular rise in the surface adjacent the lower temperature end stop for quickly separating said contacts for a sharp thermostat "OFF" position against the lower stop.

4. Apparatus as described in claim 3 wherein said contacts are inward of the free ends of all said supported blades,
  the movable contact on the free end of the second element disposed inwardly of said pivot means,
  said contacts being disposed adjacent said one stacked support.

5. In an electric steam iron having an enclosed water tank in a shell under connected handle structure and a steam generating soleplate with ports for distribution of steam on demand, a pump connected to the tank with a button on the handle for manual pump actuation to deliver water to the soleplate generating means and a mount on the soleplate for close support of a heat-responsive thermostat means abutted to a soleplate boss to control the soleplate temperature, the improvement in said thermostat means comprising, a substantially vertical control rod in the forward handle portion having manual temperature thermostat adjustment means external to the shell and high on the front thereof,
a stacked snap-acting thermostat assembly of a lower heat deformable blade, a conductive intermediate stiff blade, a conductive upper less stiff spring blade with all blades supported, secured together, and spaced apart at one end by interposed insulators, said upper blade comprising;
first and second strip type elongated elements substantially parallel to each other,
  each first and second element including compression and tension portions,
means supporting one end of the first element so the other end is free to flex vertically, insulating means transferring deformable blade movement to said first element, pivot means connecting one end of the second element to the free end of the first,
said pivot including a pivot joint between the respective compression and tension portions to place said portions under compression and tension respectively,
stops on opposite sides of the non-pivot free end of the second element and related to said pivot means so the second element free end reciprocates between said stops with a snap-action on reciprocal movement of the pivot joint between said elements,
  one of said stops being a fixed contact on the stiff intermediate blade and the other a movable stop on the free end of said first element to make and break the electric circuit controlling said soleplate temperature,
a single structural bracket extending over all said blades and mounted on and above said supported end with an enlarged integral portion on the free end,
  said portion having a bore therethrough forming an elongated bearing guide between the ends of and over said blades, said vertical temperature adjusting control rod connecting to a control shaft rotatably supported in said bore and extending into contact with the tension part of said first element to position said upper spring blade, an arcuate cam surface with end stops formed on said integral portion and facing said upper blade, a cam follower on said control shaft and biased by said upper blade against said cam surface, whereby the single bracket performs multiple functions of shaft bearing, cam surface and end stops, and with its shaft, an adjustment on the first element tension portion to vary the snapaction, and acts as a fixed locator of all structural parts tightly against said iron soleplate boss.

6. Apparatus as described in claim 5 wherein said bore is smooth and unobstructed permitting free longitudinal sliding movement by the shaft at all times.

7. Apparatus as described in claim 6 wherein said cam surface falls smoothly from an upper temperature stop down toward said blades over an arc between substantially 180°–230° and, an angular rise in the surface adjacent the lower temperature end stop for quickly separating said contacts for a sharp thermostat "OFF" position against the lower end stop.

8. Apparatus as described in claim 7 wherein said contacts are inward of the free ends of all said supported blades, the movable contact on the free end of the second element disposed inwardly of said pivot means, said contacts being disposed adjacent said one stacked support.

* * * * *